Figure 1:
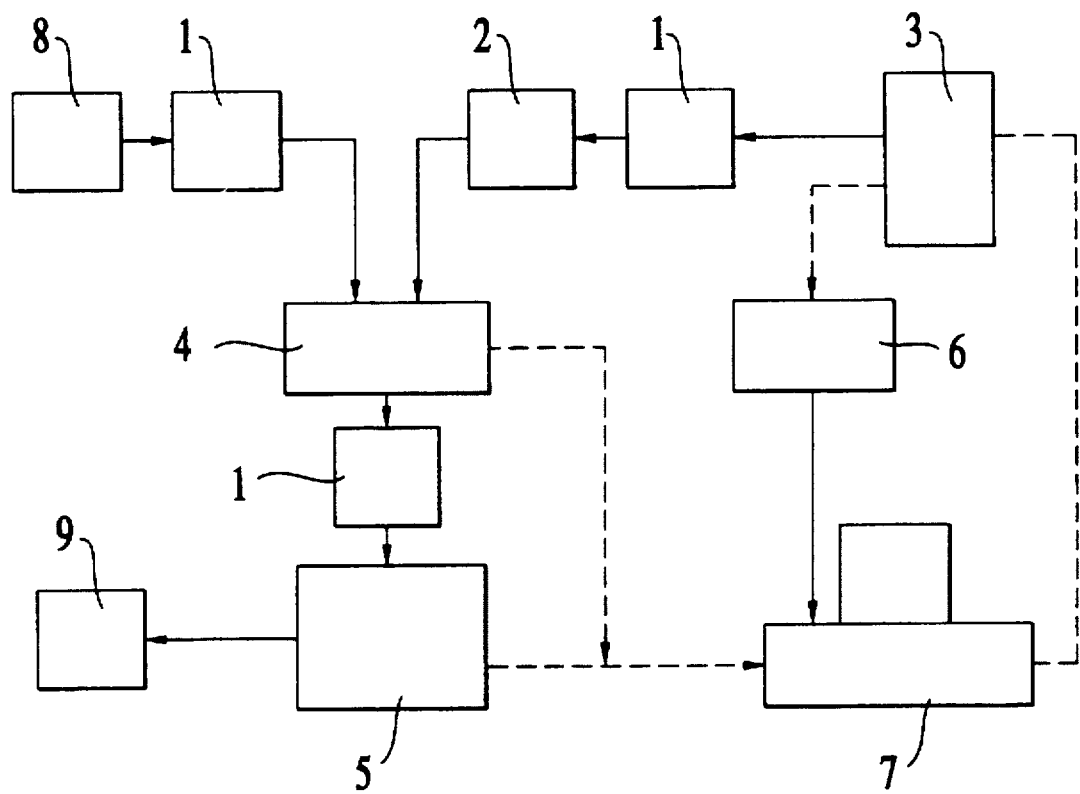

United States Patent [19]

Von Der Eltz et al.

[11] Patent Number: 5,779,739
[45] Date of Patent: *Jul. 14, 1998

[54] DYE MIXTURES OF FIBER-REACTIVE AZO DYES AND THEIR USE FOR DYEING HYDROXY-AND/OR CARBOXAMIDO-CONTAINING FIBER MATERIAL

[75] Inventors: Andreas Von Der Eltz, Frankfurt am Main; Werner Hubert Russ, Flörsheim; Bengt-Thomas Gröbel, Niederems, all of Germany

[73] Assignee: Hoechst Aktiengesellschaft, Germany

[*] Notice: The term of this patent shall not extend beyond the expiration date of Pat. No. 5,690,698.

[21] Appl. No.: 627,937

[22] Filed: Mar. 28, 1996

[30] Foreign Application Priority Data

Mar. 30, 1995 [DE] Germany ............ 195 11 688.7

[51] Int. Cl.$^6$ .................. D06P 1/384; C09B 67/22
[52] U.S. Cl. .................................. 8/549; 8/641
[58] Field of Search ............................ 8/549, 641

[56] References Cited

U.S. PATENT DOCUMENTS

| 5,071,442 | 12/1991 | Luttringer et al. |
| 5,445,654 | 8/1995 | Hussong et al. ............ 8/546 |
| 5,456,727 | 10/1995 | Heimliny et al. ............ 8/549 |

FOREIGN PATENT DOCUMENTS

| 2 132 480 | 3/1995 | Canada. |
| 0 437 184 | 7/1991 | European Pat. Off. |
| 0 600 322 | 6/1994 | European Pat. Off. |
| 0 644 240 | 3/1995 | European Pat. Off. |
| 0 668 328 | 8/1995 | European Pat. Off. |
| 0 679 697 | 11/1995 | European Pat. Off. |
| 0 681 008 | 11/1995 | European Pat. Off. |
| 4414320 | 10/1995 | Germany. |
| 2-73870 | 3/1990 | Japan. |
| 2-202956 | 9/1990 | Japan. |
| 91-2676 | 5/1991 | Rep. of Korea. |
| 91-6386 | 8/1991 | Rep. of Korea. |
| 91-8343 | 10/1991 | Rep. of Korea. |

*Primary Examiner*—Margaret Einsmann
*Attorney, Agent, or Firm*—Connolly and Hutz

[57] ABSTRACT

Dye mixtures of fiber-reactive azo dyes and their use for dyeing hydroxy- and/or carboxamido-containing fiber material Red-dyeing fiber-reactive phenylazoaminonaphthol dyes, yellow-dyeing fiber-reactive phenylazoaminobenzene dyes, blue-dyeing fiber-reactive copper formazan dyes and navy-dyeing fiber-reactive disazo dyes of the formulae (1) to (5) as claimed and defined in claim 1 are described which are suitable for dyeing hydroxy- and/or carboxamido-containing fiber material, such as cellulose fiber materials, wool and synthetic polyamide fibers individually or together or some of them together or as a mixture in trichromatic dyeing methods. During the dyeing process a definite hue within the color triangle can be obtained and kept constant by adding the individual dye solutions of the individual dyes and/or mixtures of some of the dyes in a controlled manner by means of the ATR measurement technique.

18 Claims, 1 Drawing Sheet

--------- Computer control

———— Liquid flow

- - - - - - - Computer control

———— Liquid flow

DYE MIXTURES OF FIBER-REACTIVE AZO DYES AND THEIR USE FOR DYEING HYDROXY-AND/OR CARBOXAMIDO-CONTAINING FIBER MATERIAL

DESCRIPTION

The invention is in the technical field of fiber-reactive dyes.

The efforts at widening or supplementing the ranges of dyes by means of modern reactive dyes reach, in many respects, limits which can be overcome only insufficiently, if at all, by means of an individual dye component. Individual dyes are not suitable for this purpose, especially in those cases in which it is desirable to produce definite hues. Rather, definite hues can only be obtained by using mixtures of definite differently colored dyes. According to the theory of subtractive color mixing, only three dyes having the ideal colors cyan, yellow and magenta are necessary to produce all hues. The color space formed by this triangle of colors, contains all hues available by mixing.

Dyeing with such dye mixtures has been known for a long time in practical application under the name of "trichromatic dyeing". In general, three dyes are used, the first of which is a blue-dyeing, the second a yellow-dyeing and the third a red-dyeing dye. However, in order to obtain certain effects and shifts in hue, it is common to use additionally one or two other dyes in this dye mixture, frequently only in small amounts. A requirement of the use of dyes in a mixture in trichromatic dyeing is that the dyes exhibit, if possible, the same dyeing behavior. This is especially true of their substantivity, migration behavior and degree of fixation. Moreover, the dyeing behavior of dyes should, if possible, remain constant during the entire dyeing process to ensure that the same hues are obtained not only at the beginning of the dyeing process, such as, for example, in a continuous dyeing process, but also at the end of the process. Thus, in ideal trichromatic dyeing, discontinuing the dyeing process at some point in time has no adverse effect, if it is continued later using the same dyeing recipe, for the hue of the dyeing obtained should be nearly identical at each point of the dyeing process and only the color depth should increase.

According to the present invention, dyes of the formulae (1) to (5) given and defined below have now been found which individually or together or some of them together or as a mixture fulfil the requirements for use in trichromatic dyeing.

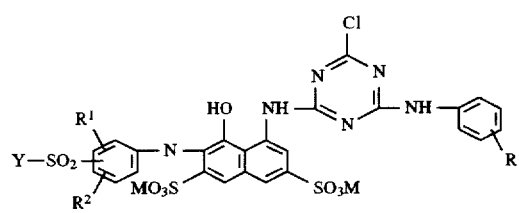

(1)

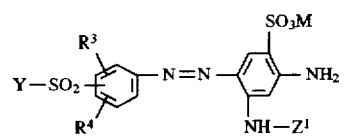

(2)

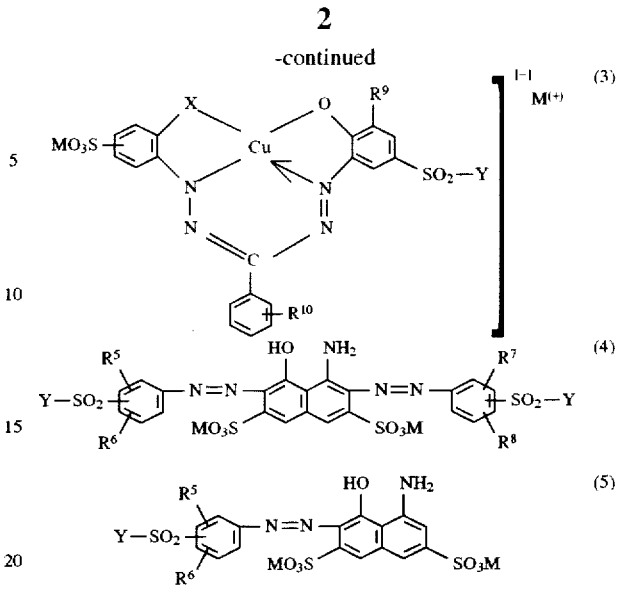

In these formulae,

M is hydrogen or an alkali metal, such as lithium, sodium and potassium, $R^1$ is hydrogen, methyl, ethyl, methoxy or ethoxy, preferably methoxy and hydrogen, and in particular hydrogen, $R^2$ is hydrogen, methyl, ethyl, methoxy or ethoxy, preferably hydrogen, $R^3$ is hydrogen, methyl, ethyl, methoxy or ethoxy, preferably methoxy and hydrogen, and in particular hydrogen, $R^4$ is hydrogen, methyl, ethyl, methoxy or ethoxy, preferably hydrogen, $R^5$ is hydrogen, methyl, ethyl, methoxy or ethoxy, preferably methoxy and hydrogen, and in particular hydrogen, $R^6$ is hydrogen, methyl, ethyl, methoxy or ethoxy, preferably hydrogen, $R^7$ is hydrogen, methyl, ethyl, methoxy or ethoxy, preferably methoxy and hydrogen, and in particular hydrogen, $R^8$ is hydrogen, methyl, ethyl, methoxy or ethoxy, preferably hydrogen, $R^9$ is hydrogen or sulfo, $R^{10}$ is hydrogen, alkyl of 1 to 4 carbon atoms, such as methyl or ethyl, sulfo, carboxy , alkanoyl of 2 to 5 carbon atoms, such as propionyl or acetyl, or a group of the formula $-SO_2-Y$ where Y has one of the meanings given below, and preferably it is hydrogen or sulfo, X is carbonyloxy of the formula $-CO-O-$ or oxy of the formula $-O-$ or is the group $-SO_3{}^{(-)}$, preferably carbonyloxy, each Y, independently of the others, is vinyl, β-chloro-ethyl, β-thiosulfatoethyl or β-sulfatoethyl, R is hydrogen, methyl, sulfo, carboxy or a group of the formula $-SO_2-Y$ where Y has one of the meanings given above, $z^1$ is alkanoyl of 2 to 5 carbon atoms, such as propionyl and acetyl, or is benzoyl, 2-cyanamino-4-chloro-1,3,5-triazin-6-yl, 2-cyanamino-4-fluoro-1,3,5-triazin-6-yl, 2,4-dichloro-1,3,5-triazin-6-yl or a group of the formula (a)

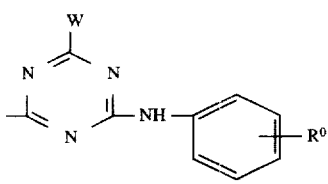

in which

W is chlorine, fluorine or cyanamino and

R⁰ is sulfo, carboxy or a group of the formula —SO₂—Y where Y has one of the meanings given above.

The individual formula members in the formulae (1), (2), (3), (4) and (5) can, within their definition, have meanings which are identical to or different from one another.

A sulfo group is a group of the formula —SO₃M, a carboxy group is a group of the formula —COOM, a sulfato group is a group of the formula —OSO₃M, and a thiosulfato group is a group of the formula —S—SO₃M where M has in each case the meaning given above.

The dyes of the formulae (1) to (5) are disclosed, for example, in German Patents 960,534 and 965,902 and U.S. Pat. No. 4,257,770 and in European Patents 0,032,187, 0,094,055, 0,073,481, 0,028,787, 0,028,788 and 0,135,040 or can be prepared analogously to the procedures described there.

The groups Y—SO₂— are preferably attached to the benzene moiety in the meta or para position relative to the azo groups or amino groups. Y—SO₂— is preferably vinylsulfonyl and particularly preferably β-sulfatoethylsulfonyl.

The invention provides in particular mixtures of these dyes. The mixtures according to the invention comprise one or more, such as two, three or four, monoazo dyes of the formula (1) and one or more, such as two or three, monoazo dyes of the formula (2), or they comprise one or more, such as two, three or four, monoazo dyes of the formula (1) and one or two copper formazan dyes of the formula (3) or one or more, such as two, three or four, disazo dyes of the formula (4) or a mixture of these dyes of the formulae (3) and (4), and, if desired, one or two monoazo dyes of the formula (5), or they comprise one or two copper formazan dyes of the formula (3) or one or more, such as two, three or four, disazo dyes of the formula (4) or a mixture of these dyes of the formulae (3) and (4) and one or more, such as two or three, monoazo dyes of the formula (2) and, if desired, one or two monoazo dyes of the formula (5), or they comprise one or more, such as two, three or four, monoazo dyes of the formula (1), one or more, such as two or three, monoazo dyes of the formula (2) and one or two copper formazan dyes of the formula (3) or one or more, such as two, three or four, disazo dyes of the formula (4) or a mixture of these dyes of formulae (3) and (4) and, if desired, one or two monoazo dyes of the formula (5).

In formula (1), R is preferably a group of the formula —SO₂—Y and particularly preferably sulfo. In formula (2), Z¹ is preferably acetyl. If more than one monoazo dye of the formula (1) are present in the dye mixtures according to the invention, they are preferably those dyes of the formula (1) in which the groups Y—SO₂— are vinylsulfonyl and β-sulfatoethylsulfonyl and R is sulfo or they are preferably dye mixtures of those monoazo dyes of the formula (1) in which the groups R are sulfo and groups of the formula —SO₂—Y where the radicals Y in formula (1) are vinyl and β-sulfatoethylsulfonyl.

The dyes of the formulae (1) to (5) can be present in the mixtures according to the invention in any desired mixing ratios which, within the color triangle, lead to the desired hues or contribute to the desired hues. Thus, the mixtures of dyes (1) and (2) and also the mixtures of dyes (1) and (3) can contain these dyes in a ratio of 99:1% by weight to 1:99% by weight. Dye mixtures containing dyes (1) and (4) or a dye (1) and a mixture of dyes (3) and (4) and, if desired, a dye (5) can contain these dyes in a ratio of 1:99:0 to 99:1:0 or of 1:92:7 to 30 97.5:2.3:0.2% by weight. Likewise, dye mixtures of dyes (2) and (3) can contain dyes (2) and (3) in a ratio of 1:99 to 99:1% by weight. In the dye mixtures containing dyes (2) and (4) or a dye (2) and a mixture of dyes (3) and (4) and, if desired, a dye (5), these dyes are usually also present in a mixing ratio of 1:99:0 to 99:1:0 or of 1:92:7 to 97.5:2.3:0.2. Mixtures of dyes of the formulae (1), (2) and (3) or (4) or (3) and (4) and, if desired, (5) usually contain these dyes in the following mixing ratio:

ratio of (1):(2):(3) between 1:1:98, 1:98:1 and 98:1:1% by weight;

mixing ratio of (1):(2):(4):(5) between 1:1:98:0, 1:98:1:0, 98:1:1:0 and 1:1:90:8% by weight;

ratio of (1):(2):(3) +(4):(5) between 1:1:98:0, 1:98:1:0, 98:1:1:0 and 1:1:90:8% by weight.

If two or more dyes of the formula (1) in which in one or two of the dyes the radical R is sulfo and in the other dye(s) the radical R is a group of the formula —SO₂—Y are present in the dye mixtures according to the invention, the dye(s) of the formula (1) where R is sulfo and the dye(s) of the formula (1) where R is —SO₂—Y are preferably present in a mixing ratio of 75:25 to 25:75% by weight, in particular of 60:40 to 40:60% by weight, relative to one another.

If dyes of the formulae (3) and (4) are present in the dye mixtures according to the invention, the dye(s) of the formula (3) and the dye(s) of the formula (4) are preferably present in a mixing ratio of 75:25 to 25:75% by weight, in particular of 60:40 to 40:60% by weight, relative to one another.

If dyes of the formula (5) are present in the dye mixtures according to the invention, they are usually present together with dyes of the formula (4). If they are present in mixtures together with one or more dyes of the formula (4), their proportion is up to 10% by weight, relative to the dyes of the formula (4).

Examples of radicals of diazo components in formulae (1), (2), (4) and (5) and phenyl substituted by a radical R or R⁰ in formulae (1) and (2) are 3-(β-sulfatoethylsulfonyl) phenyl, 4-(β-sulfatoethylsulfonyl)phenyl, 2-methyl-5-methoxy-4-(β-sulfatoethylsulfonyl)phenyl, 2-methoxy-5-(β-sulfatoethylsulfonyl)phenyl and 2,5-dimethoxy-4-(β-sulfatoethylsulfonyl)phenyrl and their vinylsulfonyl, β-chloroethylsulfonyl and β-thiosulfatoethylsulfonyl derivatives and 3-sulfophenyl and 4-sulfophenyl, of these preferably 2-methoxy-5-(β-sulfatoethysulfonyl) phenyl and 2,5-dimethoxy-4-(β-sulfatoethylsulfonyl)phenyl and in particular 3-(β-sulfatoethylsulfonyl)phenyl and 4-(β-sulfatoethylsulfonyl)phenyl and 3-sulfophenyl.

The dyes of the formulae (1) to (5), in particular those containing the same chromophore, can possess, within the meaning of Y, different fiber-reactive groups —SO₂—Y. The dye mixtures can in particular contain dyes having the same chromophore in which the fiber-reactive groups —SO₂—Y are, on the one hand, vinylsulfonyl groups and, on the other, β-chloroethylsulfonyl or β-thiosulfatoethylsulfonyl or preferably β-sulfatoethylsulfonyl groups. If such a dye component is present in the dye mixtures in the form of a vinylsulfonyl dye, the proportion of this vinylsulfonyl dye, relative to the corresponding β-chloro- or β-thiosulfato- or β-sulfatoethylsulfonyl dye, is preferably up to about 10 mol%, based on the corresponding dye chromophore.

The dye mixtures according to the invention can be present as a preparation in solid or in liquid (dissolved) form. They usually contain the electrolyte salts customary in water-soluble and in particular fiberreactive dyes, such as sodium chloride, potassium chloride and sodium sulfate, and can moreover contain the auxiliaries customary in commercial dyes, such as buffer substances which are capable of adjusting the pH in aqueous solution to a value between 3 and 7, such as sodium acetate, sodium borate, sodium bicarbonate, sodium dihydrogen phosphate and disodium hydrogen phosphate. If they are present in solid form, they can contain small amounts of siccatives or solubility-improving agents, such as the known condensation products of naphthalenesulfonic acid with formaldehyde, and if they are present in liquid form, such as in aqueous solution (including the content of thickening agents such as are customary in printing pastes), they can contain substances ensuring the durability of these preparations (mixtures), such as, for example, mold-preventing agents.

In general, the dye mixtures according to the invention are present in the form of dye powders containing electrolyte salt and having a total dye content of 20 to 70% by weight, relative to the dye powder or the preparation. In addition, these dye powders/preparations can contain the buffer substances mentioned in a total amount of up to 5% by weight, relative to the dye powder. If the dye mixtures according to the invention are present in an aqueous solution, the total dye content in these aqueous solutions is up to about 50% by weight, such as, for example, between 5 and 40% by weight, the electrolyte salt content in these aqueous solutions being preferably below 10% by weight, relative to the aqueous solution. The aqueous solutions (liquid preparations) can in general contain the buffer substances mentioned in an amount of up to 5% by weight, preferably of up to 2% by weight.

The dye mixtures according to the invention can be prepared in the usual manner, for example by mechanical mixing of the individual dyes or of mixtures of 2 or 3 of such individual dyes with the other individual dyes in the form of their dye powders or aqueous solutions. If the dye mixtures according to the invention are prepared by mechanical mixing of the individual dyes, any standardizing agents, dustproofing agents or further auxiliaries which may be necessary for mixing and are customary in dyeing technology and customary in dye preparations used for this purpose are added.

When starting from aqueous dye solutions of the individual components (individual dyes) or, if desired, from dye solutions already containing two or more of these individual components, the desired dye mixture is also obtained in aqueous form (liquid preparation) by simple mixing, taking into account the amounts of dye solutions and their dye concentrations. Such aqueous dye solutions of the individual components or mixtures of such individual components can also be synthesis solutions obtainable from the synthesis of the individual components or, if synthetically feasible, from the synthesis of mixtures of individual dyes. The aqueous solutions containing the dye mixtures according to the invention thus obtained by mixing the individual dye solutions (synthesis solutions) can then be used directly, if desired after filtration, concentration and/or addition of a buffer or other auxiliaries, for dyeing in the form of a liquid preparation. However, these dye solutions can also be converted into the pulverulent and granular dye mixtures according to the invention having the desired composition and modification, for example by spray-drying and, if required, in a fluidized bed.

However, in order to obtain desirable dye mixing ratios and hues, the aqueous dye solutions according to the invention containing the dye mixtures according to the invention can particularly advantageously be mixed by employing a multi-component analysis using UV-VIS spectra. By means of this analysis, first the exact amounts and dye concentrations of the individual components (individual dyes) present in the aqueous starting solutions are determined, and these individual components are then mixed with one another, mixing being monitored by means of a control process. This procedure is based on recording UV-VIS spectra using a photodiode spectrometer (see EP-A-0,385,587) or a fast-scanning grating spectrometer, followed by multi-component analysis, which, after calibration with the pure individual dyes or mixtures of such dyes or aqueous solutions thereof, provides exact data on the amounts and concentrations of dye in the solutions by separating the mixtures mathematically into the individual components. At every moment, the current content of the dyes can be read from a monitor. Owing to its high resolution, the measuring instrument can detect even minimal absorption shoulders, which can be used for distinguishing the dyes unequivocally from one another.

It has proven advantageous to obtain calibration series of the dyes to be determined by measuring the pure dyes prior to starting the actual measurement. As for the calibration measurements, they can contain not only individual components but also mixtures of a plurality of components. The exact concentrations are entered into the computer program separately for each dye. The concentration range of the calibration solutions should include the measuring range. These data are used for calculating a calibration matrix which is necessary for the later determination of the dye components. As used here, multicomponent analysis is understood to mean quantitative analysis of dye mixtures which makes use of the following mathematical algorithms: Partial Least Squares Type 1 (PLS-1), Partial Least Squares Type 2 (PLS-2), Methods of Least Squares, Principal Component Regression Analysis (PCR) and Classic Least Squares (CLS) or Inverse Least Squares (ILS). The Method of Least Squares (PLS) and the Principal Component Regression (PCR) are described, for example, by D. Haaland and E. V. Thomas in Anal. Chem. 1988, 60, 1193, Anal. Chem. 1988, 60, 1202 and Anal. Chem. 1990, 62, 1091 and by P. Geladi and B. Kowalewski in A. Tutorial, Laboratory for Chemometrics and Center for Process Analytical Chemistry, Dept. of Chemistry, University of Washington, Seattle, Wash. 98195. The aim of these approaches by calculation is to obtain mathematical equations which allow the determination of the content of the unknown mixtures. The principle of the PLS algorithm is to separate the available spectra into a series of mathematical spectra which are described in the form of factors. A detailed description of the procedure is available from the literature mentioned.

Via an inlet and an outlet, the individual dye solutions are pumped through a flow-through cell. The cell diameter can be as small as 0.1 cm to enable also highly concentrated solutions to be measured. The cell is placed in a UV-VIS spectrometer which is either a diode line spectrometer or a fast-scanning grating spectrometer. Dye solutions of individual components (individual dyes) can be measured directly by spectroscopy. For dye mixtures which can be analyzed directly without an intermediate concentrating step, the ATR (Attenuated Total Reflection) measuring method can be used. In this method, a quartz or alkali glass rod or a light-transporting device suitable for this purpose is dipped into the solution to be measured and the measurements are carried out at the interface between probe surface and liquid. The samples typically used for this have a concentration of 5 to 500 g/l of dye. The ATR probe is connected to the spectrometer via a glass fiber waveguide. For measurements in the VIS region, the length of the waveguide can be up to 1000 m, which is why the spectrometer can be placed centrally in a measuring station. Thus, in explosion-proof plants, no further precautions must be taken.

In order to adjust an aqueous solution according to the invention of the dye mixture to a definite dye content and a definite dye composition of the mixture, the target mixture must be measured and its color coordinates and composition in percent must be determined. During adjustment and metered addition of the individual components, these data serve as target parameter as a function of which the color difference and the individual concentrations are calculated and plotted on a graph. The dyes necessary for this as components of the mixture are then added to an already introduced dye or to a mixture of dyes of the mixture according to the invention over a sufficiently long period for reaching the target concentrations and the target hue.

The advantage of the analytical method according to the invention is that it is not only suitable for on-line analysis of the composition and dye concentrations of dye solutions but analogously also of the dyeing liquors and of the bath exhaustion taking place in the dyeing bath during the dyeing process, which, if desired, can be plotted on a graph. The procedure for dyeing pretreated cotton or polyamide-containing blend fabrics is, for example, as follows: an aqueous dyeing liquor comprising the dye mixture according to the invention and, for example, two or three other reactive dyes useful in trichromatic dyeing is introduced into a dyeing-machine suitable for this purpose, and this is followed by introducing the textile goods. To obtain a uniform dyeing, the liquor is continuously recirculated at room temperature. Via an inlet and an outlet, the liquor is pumped through thin rubber or teflon tubings and through a flow-through cell whose diameter, as already mentioned in the above case, can be as small as 0.1 cm to enable also highly concentrated liquors to be measured. The cell is placed in a UV-VIS spectrometer which is either a diode line spectrometer or a fast-scanning grating spectrometer. Since in this case the solution is a neutral dyeing liquor, it can be measured directly by spectroscopy. Alternatively, in the case of dye mixtures which can be analyzed directly without an intermediate concentrating step, the ATR (Attenuated Total Reflection) measuring method, as described above for preparing the aqueous dye mixtures, can be used.

At the beginning of the dyeing process, a continuous measurement on the spectrometer is started. The computer program initiates a measurement on the spectrometer and processes the recorded spectrum by means of multi-component analysis. The concentrations obtained therefrom are converted into percent staring amount and displayed graphically on the screen. In trichromatic dyeing, it is possible, for example, to determine to what extent and with what effect on the quality the dye mixture according to the invention can be used in combination with definite blue-dyeing, red-dyeing and orange- or yellow-dyeing reactive dyes customary in trichromatic dyeing and how bath exhaustion is obtained in this process. The effects which the addition of additives, such as, for example, electrolysis salts and alkali, or else changes in temperature have on dyeing are detected by this method just as rapidly and beyond a doubt. In this manner, the trichromatic dyeing process can be easily monitored. This can be done by continuously removing from the dyeing liquor small samples which are then neutralized with buffer solution in the manner described above for the calibration solutions. Without a doubt, it is important that the calibrations be performed under the same conditions as the later measurement, since the absorptions and extinctions of the dyes can undergo a change at higher pH values. This sample of, for example, 0.5 ml can be removed from the liquor by, for example, circulating the latter through a thin teflon or rubber tubing using a pump (1) (see FIG. 1) and opening a valve (2) in that cycle for a brief period corresponding to a flow of 0.5 ml. The removed sample is neutralized with a buffer solution at pH 7 from a buffer storage tank (8), diluted with water und pumped through a flow-through cell of the UV-VIS spectrometer (5) and finally into the waste tank (9) using a pump. The sample and the buffer solution are mixed in or by means of an autosampler (4) which transmits a starting signal to the UV-VIS measuring apparatus (5). The time control is triggered in this case by the concentrating step, which is slower. Moreover, an apparatus for measuring pH values and temperatures (6) can detect whether the dyeing process is dependent on these parameters. For example, by using a suitable program of the computer (7), a pump can raise the pH continuously during dyeing by pumping in base. This corresponds to an Automet process (see, in particular, ®Remazol Automet) for dyeings, which process proceeds, however, not only in accordance with a previously established algorithm but can also be regulated by the degree of exhaustion of the dyes. The used-up liquor can then be reconcentrated by adding the required amount of dye and, if necessary, water. The concentration step is also monitored by means of multi-component analysis.

Depending on the composition of the individual dye components, the dye mixtures according to the invention produce dyeings of various hues exhibiting good color build-up and, in particular, good ability of unfixed portions of dye being washed out of the dyed materials on hydroxy- and/or carboxamido-containing fiber materials by the application and fixation methods extensively described in the art of fiber-reactive dyes, in particular by the procedures of trichromatic dyeing.

Accordingly, the present invention also relates to the use of the dye mixtures according to the invention or of the dyes of the formulae (1) to (4) and, if desired, (5) together or some of them together, in a trichromatic dyeing process also individually, for dyeing (including printing) hydroxy- and/or carboxamido-containing fiber materials and to processes for dyeing such fiber materials with a dye mixture according to the invention or the dyes of the formulae (1) to (4) and, if desired, (5) together or some of them together, in a trichromatic dyeing process also individually, by applying the dye mixture or these dyes in dissolved form to the substrate and fixing the dyes on the fiber by reaction with an alkaline agent or by means of heat or by both measures.

Hydroxy-containing materials are natural or synthetic hydroxy-containing materials, such as, for example, cellulose fiber materials, which may also be in the form of paper, or regenerated products thereof and polyvinyl alcohols. Cellulose fiber materials are preferably cotton, but also other vegetable fibers, such as linen, hemp, jute and ramie fibers. Examples of regenerated cellulose fibers are staple viscose and filament viscose.

Examples of carboxamido-containing materials are synthetic and natural polyamides and polyurethanes, in particular in the form of fibers, for example wool and other animal hair, silk, leather, nylon 6/6, nylon 6, nylon 11 and nylon 4.

The dye mixtures according to the invention are applied by generally known methods for the dyeing and printing of fiber materials in accordance with the known application methods for fiber-reactive dyes. Since the dyes of the dye mixtures according to the invention are highly compatible with one another, the dye mixtures according to the invention can be used advantageously in particular in exhaust dyeing methods. Accordingly, they produce dyeings in very high color yields in combination with excellent color build-up and constant hues, which are largely independent of the dyeing time, for example on cellulose fibers, by the exhaust method from a long liquor at temperatures between 40° and 105° C., if desired at temperatures of up to 130° C. under pressure, and, if desired, in the presence of customary dyeing assistants using acid scavengers and, if desired, neutral salts, such as sodium chloride or sodium sulfate. The procedure can be such that the warm bath is entered with the material and then gradually heated to the desired dyeing temperature, and the dyeing process is completed at this temperature.

Likewise, the customary printing methods for cellulose fibers, which can either be carried out in a single phase, for example by printing with a printing paste containing sodium bicarbonate or another acid binding agent and the colorant, followed by steaming at 100° to 103° C., or in two phases, for example by printing with a neutral or weakly acidic printing paste containing the colorant, followed by fixing either by passing the printed goods through a hot electrolyte-containing alkaline bath or by overpadding with an alkaline electrolyte-containing padding liquor, followed by storing the treated material or by steaming or by treatment with dry heat, produce strong prints having crisp contours and a clear white ground. Varying fixation conditions have only a slight effect on how the prints turn out. Not only in the dyehouses but also in the printing plants, the degrees of fixation obtained with the dye mixtures according to the invention are very high. When fixing is carried out by means of dry heat using the customary dry heat setting methods, hot air at 120° to 200° C. is used. Apart from the customary steam at 101° to 103° C., superheated steam and pressurized steam having temperatures of up to 160° C. can also be used.

Examples of the acid binding agents effecting the fixation of the dyes on the cellulose fibers are water-soluble basic alkali metal salts and alkaline earth metal salts of inorganic or organic acids and also compounds releasing alkali in the heat. They include in particular alkali metal hydroxides and alkali metal salts of weak to medium-strong inorganic or organic acids, alkali metal compounds being preferably sodium compounds and potassium compounds. Examples of such agents are sodium hydroxide, potassium hydroxide, sodium carbonate, sodium bicarbonate, potassium carbonate, sodium formate, sodium dihydrogen phosphate and disodium hydrogen phosphate.

Treatment of the dyes of the dye mixtures according to the invention with the acid binding agents, if appropriate with the application of heat, results in chemical bonding of the dyes to the cellulose fiber. In particular cellulose dyeings exhibit, after customary aftertreatment by rinsing to remove unfixed portions of dye, excellent wet fastness properties, especially since unfixed portions of dye can be easily washed out owing to their good cold water solubility.

The dyeings on polyurethane and polyamide fibers are usually carried out from an acid medium. Thus, to obtain the desired pH, it is possible to add to the dyeing bath, for example, acetic acid and/or ammonium sulfate and/or acetic acid and ammonium acetate or sodium acetate. To achieve a useful levelness of the dyeing, it is recommended to add customary leveling agents, such as, for example, those based on a cyanuric chloride adduct with three times the molar amount of an aminobenzenesulfonic acid or aminonaphthalenesulfonic acid or those based, for example, on a stearylamine adduct with ethylene oxide. Typically, the material to be dyed is introduced into the bath at a temperature of about 40° C. and agitated therein for some time, the dyeing bath is then readjusted to the desired weakly acid, preferably weakly acetic acid, pH, and the actual dyeing is then carried out at a temperature between 60° and 98° C. However, the dyeings can also be carried out at the boiling temperature or at temperatures of up to 120° C. (under presssure).

The Examples below serve to illustrate the invention. Parts and percentages are by weight, unless stated otherwise. Parts by weight relate to parts by volume as the kilogram relates to the liter.

If the formulae of the dyes are given in the Examples in the form of the free acid, the parts given relate to the acid form. However, the dyes are usually used as an alkali metal salt powder containing electrolyte salts (for example containing sodium chloride or sodium sulfate) which is the form customary for water-soluble dyes.

EXAMPLE 1

96 parts of an aqueous solution, such as, for example, an as-synthesized aqueous solution, containing 48 parts of the navy-dyeing disazo dye of the formula (A)

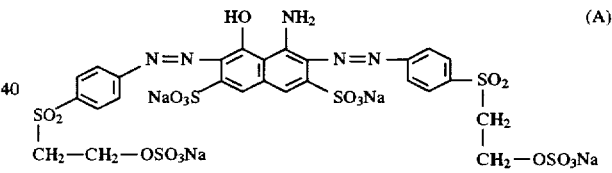

and 4 parts of the red-dyeing monoazo dye of the formula (B)

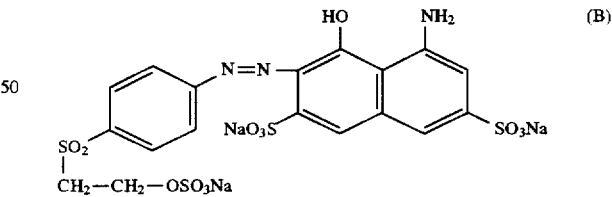

33 parts of an aqueous solution, such as, for example, an as-synthesized aqueous solution, containing 11 parts of the red monoazo dye of the formula (C)

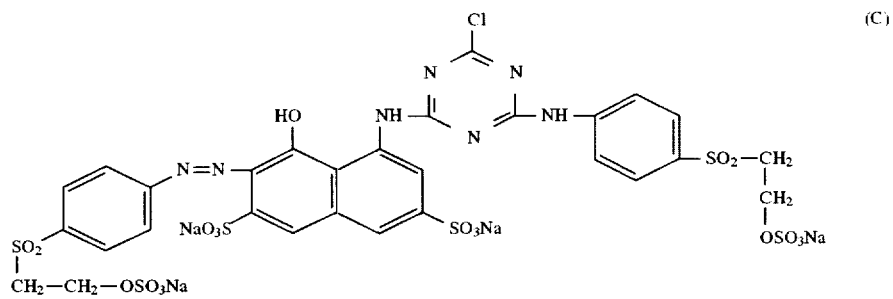

(C)

and 105 parts of an aqueous solution, such as, for example, an as-synthesized aqueous solution, containing 3.5 parts of the golden-yellow-dyeing monoazo dye of the formula (D)

and 22.5 parts of an aqueous solution, such as, for example, an as-synthesized aqueous solution, containing 7.5 parts of the golden-yellow-dyeing monoazo dye of the formula (F)

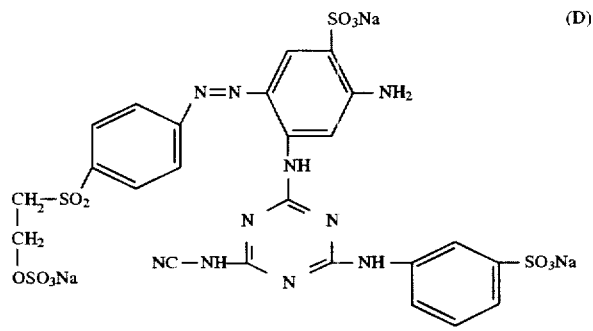

(D)

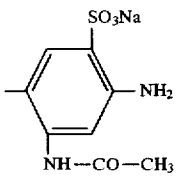

(F)

(where these solutions can additionally contain or additionally contain electrolyte salts, such as sodium chloride, or customary auxiliaries, such as, for example, buffers and surface-active agents) are mixed with one another.

The resulting aqueous dye mixture according to the invention can be used directly for dyeing or be converted into solid form by spray-drying and, if desired, granulation. The dye mixture according to the invention produces strong, level navy dyeings and prints exhibiting good fastness properties, for example on cellulose fiber materials, by the application and fixation methods customary in the art of fiber-reactive dyes.

EXAMPLE 2

32 parts of an aqueous solution, such as, for example, an as-synthesized aqueous solution, containing 16 parts of the navy-dyeing disazo dye of the formula (A) and 1.6 parts of the red-dyeing monoazo dye of the formula (B), 105 parts of an aqueous solution, such as, for example, an as-synthesized aqueous solution, containing 35 parts of the red monoazo dye of the formula (E)

(where these solutions can additionally contain or additionally contain electrolyte salts, such as sodium chloride, or customary auxiliaries, such as, for example, buffers and surface-active agents) are mixed with one another.

The resulting aqueous dye mixture according to the invention can be used directly for dyeing or be converted into solid form by spray-drying and, if desired, granulation. The dye mixture according to the invention produces strong, level violet dyeings and prints exhibiting good fastness properties, for example on cellulose fiber materials, by the application and fixation methods customary in the art of fiber-reactive dyes.

EXAMPLE 3

80 parts of an aqueous solution, such as, for example, an as-synthesized aqueous solution, containing 40 parts of the navy-dyeing disazo dye of the formula (A) and 3 parts of the red-dyeing monoazo dye of the formula (B), 24 parts of an aqueous solution, such as, for example, an as-synthesized aqueous solution, containing 8 parts of the red monoazo dye of the formula (C), 24 parts of an aqueous solution, such as, for example, an as-synthesized aqueous solution, containing 8 parts of the red monoazo dye of the formula (E), and 1 part of an aqueous solution, such as, for example, an as-synthesized aqueous solution, containing 0.5 part of the golden-yellow-dyeing monoazo dye of the formula (D)

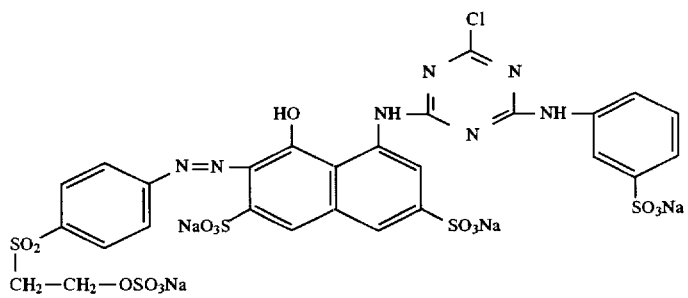

(E)

(where these solutions can additionally contain or addition ally contain electrolyte salts, such as sodium chloride, or customary auxiliaries, such as, for example, buffers and surface-active agents) are mixed with one another.

The resulting aqueous dye mixture according to the invention can be used directly for dyeing or be converted into solid form by spray-drying and, if desired, granulation. The dye mixture according to the invention produces strong, level dark blue dyeings and prints exhibiting good fastness properties, for example on cellulose fiber materials, by the application and fixation methods customary in the art of fiber-reactive dyes.

EXAMPLE 4

47 parts of an aqueous solution, such as, for example, an as-synthesized aqueous solution, containing 23.5 parts of the copper formazan dye of the formula (G)

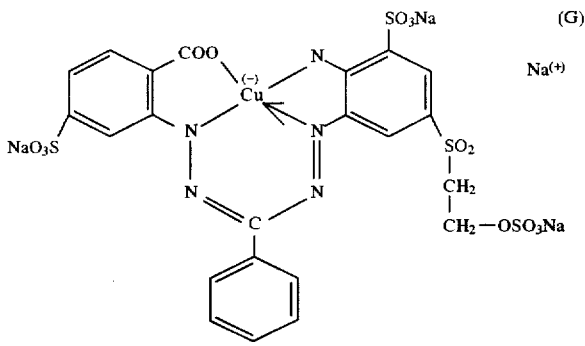

3 parts of an aqueous solution, such as, for example, an as-synthesized aqueous solution, containing 1 part of the red monoazo dye of the formula (C), and 15 parts of an aqueous solution, such as, for example, an as-synthesized aqueous solution, containing 5 parts of the golden-yellow-dyeing monoazo dye of the formula (D) (where these solutions can additionally contain or additionally contain electrolyte salts, such as sodium chloride, or customary auxiliaries, such as, for example, buffers and surface-active agents) are mixed with one another.

The resulting aqueous dye mixture according to the invention can be used directly for dyeing or be converted into solid form by spray-drying and, if desired, granulation. The dye mixture according to the invention produces strong, level grey dyeings and prints exhibiting good fastness properties, for example on cellulose fiber materials, by the application and fixation methods customary in the art of fiber-reactive dyes.

EXAMPLE 5

20 parts of an aqueous solution, such as, for example, an as-synthesized aqueous solution, containing 10 parts of the copper formazan dye of the formula (G), 20 parts of an aqueous solution, such as, for example, an as-synthesized aqueous solution, containing 10 parts of the navy-dyeing disazo dye of the formula (A) and 1 part of the red-dyeing monoazo dye of the formula (B), 6 parts of an aqueous solution, such as, for example, an as-synhesized aqueous solution, containing 2 parts of the red monoazo dye of the formula (C), and 21 parts of an aqueous solution, such as, for example, an as-synthesized aqueous solution, containing 7 parts of the golden-yellow-dyeing monoazo dye of the formula (D) (where these solutions can additionally contain or additionally contain electrolyte salts, such as sodium chloride, or customary auxiliaries, such as, for example, buffers and surface-active agents) are mixed with one another.

The resulting aqueous dye mixture according to the invention can be used directly for dyeing or be converted into solid form by spray-drying and, if desired, granulation. The dye mixture according to the invention produces strong, level black dyeings and prints exhibiting good fastness properties, for example on cellulose fiber materials, by the application and fixation methods customary in the art of fiber-reactive dyes.

EXAMPLE 6

33 parts of a dye powder of the dye of the formula (C) containing electrolyte salt (predominantly containing sodium chloride) and having a dye content of 50%, 20.5 parts of a dye powder of the dye of the formula (D) containing electrolyte salt and having a dye content of 50%, and 15.5 parts of a mixture of a dye powder of the dyes of the formulae (A), (B) and (G) containing electrolyte salt and 25% of dye (A), 0.5% of dye (B) and 25% of dye (G) are mixed mechanically with one another. The resulting dye mixture according to the invention produces strong, level dark red dyeings and prints exhibiting good fastness properties, by the dyeing and printing methods customary in the art of fiber-reactive dyes, for example as described in Examples A to F below.

EXAMPLE 7

8 parts of a dye powder of the dye of the formula (C) containing electrolyte salt (predominantly containing sodium chloride) and having a dye content of 50%, 8 parts of a dye powder of the dye of the formula (E) containing electrolyte salt (predominantly containing sodium chloride) and having a dye content of 50%, 6 parts of a dye powder of the dye of the formula (D) containing electrolyte salt and having a dye content of 50%, and 1 part of a powder of the dye of the formula (A) containing electrolyte salt and having a dye content of 50% are mixed mechanically with one another.

The resulting dye mixture according to the invention produces strong, level orange-red dyeings and prints exhibiting good fastness properties, by the dyeing and printing methods customary in the art of fiber-reactive dyes, for example as described in Examples A to G below.

EXAMPLE 8

72 parts of an aqueous solution, such as, for example, an as-synthesized aqueous solution, containing 36 parts of the navy-dyeing disazo dye of the formula (A) and 3.6 parts of the red-dyeing monoazo dye of the formula (B), 25.5 parts of an aqueous solution, such as, for example, an as-synthesized aqueous solution, containing 8.5 parts of the red monoazo dye of the formula (C) and 6 parts of an aqueous solution, such as, for example, an as-synthesized aqueous solution, containing 2 parts of the golden-yellow-dyeing monoazo dye of the formula (D) (where these solutions can additionally contain or additionally contain electrolyte salts, such as sodium chloride, or customary auxiliaries, such as, for example, buffers and surface-active agents) are mixed with one another using the analytical system explained in the general description section and the resulting control by pumps effecting metered addition of the dye solutions. The target parameters are the dye site and the individual dye concentrations of a conventionally prepared dye mixture according to the present invention defined by the colorist as desirable dye mixture. During addition of dyes (C) and (D) to the dye solution of dyes (A) and (B), the color difference and the concentration of the individual dyes of the mixture present at each moment are shown on the monitor at each moment. Upon reaching the target values, addition of the dye solutions is stopped.

The resulting aqueous dye mixture according to the invention can be used directly for dyeing or be converted into solid form by spray-drying and, if desired, granulation. It produces level blue-green dyeings and prints exhibiting good fastness properties, for example on cellulose fiber materials, by the application and fixation methods customary in the art of fiber-reactive dyes.

EXAMPLES 9 to 18

In the Table Examples which follow, further dye mixtures according to the invention are described which produce level dyeings and prints in the hue given in the particular table example (in the particular Table Example, the shade at medium color depth obtainable with the dye mixture according to the invention is given; naturally the resulting shades are lighter or darker, depending on the amount of dye mixture added to the dyeing bath, dyeing liquor or printing paste) on the materials mentioned in the description, in particular cellulose fiber materials such as cotton, by the dyeing and printing methods customary in the art of fiber-reactive dyes.

| Example | Dye mixture, containing | Hue |
|---|---|---|
| 9 | 93.3% of dye (F) | |
| | + 1.95% of dye (E) | |
| | + 4.75% of dye (G) | orange-brown |
| 10 | 82% of dye (F) | |
| | + 8.4% of dye (C) | |
| | + 9.6% of dye (G) | brown |
| 11 | 45.8% of dye (D) | |
| | + 42.7% of dye (C) | |
| | + 10.7% of dye (A) | |
| | + 0.8% of dye (B) | brown |
| 12 | 66.7% of dye (D) | |
| | + 11.65% of dye (C) | |
| | + 11.65% of dye (E) | |
| | + 5.0% of dye (G) | |
| | + 4.5% of dye (A) | |
| | + 0.5% of dye (B) | red-brown |
| 13 | 4.85% of dye (C) | |
| | + 4.85% of dye (E) | |
| | + 44.5% of dye (G) | |
| | + 43.4% of dye (A) | |
| | + 2.4% of dye (B) | blue |
| 14 | 91.9% of dye (F) | |
| | + 3.5% of dye (E) | |
| | + 4.6% of dye (G) | orange-brown |
| 15 | 84.5% of dye (F) | |
| | + 6.5% of dye (C) | |
| | + 9.0% of dye (G) | brown |
| 16 | 41.2% of dye (D) | |
| | + 25.8% of dye (C) | |
| | + 31.0% of dye (A) | |
| | + 2.0% of dye (B) | brown |
| 17 | 70.8% of dye (D) | |
| | + 9.9% of dye (E) | |
| | + 9.9% of dye (C) | |
| | + 4.7% of dye (G) | |
| | + 4.6% of dye (A) | |
| | + 0.1% of dye (B) | red-brown |
| 18 | 3.2% of dye (C) | |
| | + 3.2% of dye (E) | |
| | + 35.5% of dye (G) | |
| | + 56.5% of dye (A) | |
| | + 1.6% of dye (B) | blue |

EXAMPLE A 100 parts of a mercerized bleached cotton knitted fabric are dyed in a jet-dyeing machine with 1000 parts of an aqueous solution containing 1 part of the red-dyeing monoazo dye of the formula (E), 1 part of the yellow-dyeing monoazo dye of the formula (D) and 1 part of the blue-dyeing copper formazan dye of the formula (G) and 80 parts of anhydrous sodium sulfate, 5 parts of an aqueous 15% sodium carbonate solution and 2 parts by volume of a 33% aqueous sodium hydroxide solutions, for 60 minutes at a dyeing temperature of 60° C. The dyeing liquor is then discharged, and the dyed knitted fabric is first rinsed with cold water and then with hot and boiling water, treated in an aqueous washing solution containing about 1 to 2 parts of a nonionic commercially available detergent per 1000 parts for 15 minutes at 95° to 100° C., rinsed again with hot and cold water and then spin-dried and redried to give a level red-brown dyeing having good fastness properties.

EXAMPLE B 100 parts of a mercerized bleached cotton knitted fabric are introduced into a jet-dyeing machine containing 1000 parts of an aqueous solution containing 1 part of the yellow-dyeing dye of the formula (D), 0.5 part of the red-dyeing dye of the formula (C), 0.5 part of the red-dyeing dye of the formula (E), 0.3 part of the navy-dyeing dye of the formula (A) and 0.2 part of the blue-dyeing dye of the formula (G) and 80 parts of sodium sulfate. First, the knitted fabric is agitated in the dyeing liquor at 20° C. for about 5 minutes; then, while agitation is continued, five parts of an aqueous 15% sodium carbonate solution and 2 parts of a 33% aqueous sodium hydroxide solution are added. The dyeing liquor is steadily heated to 60° C. over a period of 15 minutes, and the dyeing process is continued at 60° C. for another 60 minutes. The dyeing liquor is then discharged, and the dyed knitted fabric is rinsed, subjected to an aftertreatment and finished by the procedure given in Example A. This gives a level brown dyeing having good fastness properties.

EXAMPLE C 100 parts of a mercerized bleached cotton knitted fabric are introduced into a jet-dyeing machine containing 1000 parts of an aqueous solution containing 0.3 part of the yellow-dyeing dye of the formula (D), 0.3 part of the red-dyeing dye of the formula (C), 0.3 part of the red-dyeing dye of the formula (E), 0.3 part of the navy-dyeing dye of the formula (A) and 0.2 part of the blued-dyeing dye of the formula (G) and 80 parts of sodium sulfate. First, the knitted fabric is agitated in the dyeing liquor at 20° C. for about 5 minutes; then, while agitation of the dyeing liquor is continued, 5 parts of an aqueous 15% sodium carbonate solution and 2 parts of a 33% aqueous sodium hydroxide solution are added. The dyeing liquor is steadily heated to 60° C. over a period of 15 minutes, and the dyeing process is continued at 60° C. for another 60 minutes. The dyeing liquor is then discharged, and the dyed knitted fabric is rinsed, subjected to an aftertreatment and finished by the procedure given in Example A. This gives a level beige dyeing having good fastness properties.

EXAMPLE D 100 parts of a mercerized bleached cotton knitted fabric are dyed in a jet-dyeing machine in 1000 parts of an aqueous dyeing solution containing 1 part of the yellow-dyeing dye of the formula (D), 1 part of the red-dyeing dye of the formula (C), 0.25 part of the navy-dyeing dye of the formula (A), 0.25 part of the blue-dyeing copper formazan dye of the formula (G) and 50 parts of sodium sulfate, 5 parts of a 15% aqueous sodium carbonate solution and 2 parts of a 33% aqueous sodium hydroxide solution, for 60 minutes at 60° C. The resulting dyed cotton knitted fabric is then subjected to an aftertreatment and finished in the usual manner, such as, for example, described in Example A. This gives a level brown dyeing having good fastness properties.

EXAMPLE E 100 parts of a mercerized bleached cotton knitted fabric are dyed in a jet-dyeing machine in 1000 parts of an aqueous dyeing solution containing 0.2 part of the yellow-dyeing dye of the formula (F), 0.1 part of the red-dyeing monoazo dye of the formula (C), 0.1 part of the red-dyeing dye of the formula (E), 0.12 part of the copper formazan dye of the formula (G) and 0.18 part of the navy-dyeing dye of the formula (A) and 50 parts of sodium sulfate. 5 parts of an aqueous 15% sodium carbonate solution and 2 parts of a 33% aqueous sodium hydroxide solution, for 60 minutes at 60° C. The resulting dyed cotton knitted fabric is then subjected to an aftertreatment and finished in the usual manner, such as, for example, described in Example A. This gives a level brown dyeing having good fastness properties.

EXAMPLE F 40 parts of the dye of the formula (F) (in the form of its dye powder containing electrolyte salt), 1.5 parts of the dye of the formula (C) (in the form of its dye powder containing electrolyte salt) and 2 parts of the dye of the formula (G) (in the form of its dye powder containing electrolyte salt) are dissolved in 1000 parts of water at about 20° C. 25 parts of a 33% aqueous sodium hydroxide solution and 95 parts of water glass of 38° Bé are added to this dye solution. Mercerized cotton poplin is padded with this dyeing liquor on a commercially available padding at a liquor pick-up of about 70%, wound onto a batching roller, wrapped in a plastic film and left several hours at 20° C. The dyed fabric is then subjected to an aftertreatment and finished in the usual manner, such as, for example, in the manner described in Example A. This gives a level orange-brown dyeing having good fastness properties.

EXAMPLES G-1 to G-10

The procedure of Example A for dyeing 100 parts of a mercerized, bleached cotton knitted fabric is repeated, adding for this purpose, as the dyeing liquor, 1000 parts of an aqueous solution containing the dye mixture described in the Table Examples which follow and the electrolyte salts and alkaline agents given in Example A. Finishing the dyeings in accordance with the conditions given in Example A gives level dyeings in the hue given in the particular Table Example.

| Example | Dyes present in the dyeing liquor | Hue of the dyeing |
|---|---|---|
| G-1 | 33.5 parts of dye (F) | |
| | + 0.7 part of dye (E) | |
| | + 1.7 parts of dye (G) | orange-brown |
| G-2 | 27.4 parts of dye (F) | |
| | + 2.8 parts of dye (C) | |
| | + 3.2 parts of dye (G) | brown |
| G-3 | 30 parts of dye (D) | |
| | + 28 parts of dye (C) | |
| | + 7.0 parts of dye (A) | |
| | + 0.5 part of dye (B) | dark brown |
| G-4 | 28 parts of dye (D) | |

| Example | Dyes present in the dyeing liquor | Hue of the dyeing |
|---|---|---|
| | + 4.9 parts of dye (C) | |
| | + 4.9 parts of dye (E) | |
| | + 2.1 parts of dye (G) | |
| | + 1.9 parts of dye (A) | |
| | + 0.2 part of dye (B) | red-brown |
| G-5 | 1.4 parts of dye (C) | |
| | + 1.4 parts of dye (E) | |
| | + 12.8 parts of dye (G) | |
| | + 12.5 parts of dye (A) | |
| | + 0.7 part of dye (B) | dark blue |
| G-6 | 40 parts of dye (F) | |
| | + 1.5 parts of dye (E) | |
| | + 2.0 parts of dye (G) | orange-brown |
| G-7 | 35 parts of dye (F) | |
| | + 2.7 parts of dye (C) | |
| | + 3.7 parts of dye (G) | brown |
| G-8 | 40 parts of dye (D) | |
| | + 25 parts of dye (C) | |
| | + 30 parts of dye (A) | |
| | + 2 parts of dye (B) | dark brown |
| G-9 | 34 parts of dye (D) | |
| | + 4.75 parts of dye (E) | |
| | + 4.75 parts of dye (C) | |
| | + 2.25 parts of dye (G) | |
| | + 2.2 parts of dye (A) | |
| | + 0.05 part of dye (B) | red-brown |
| G-10 | 0.9 part of dye (C) | |
| | + 0.9 part of dye (E) | |
| | + 10 parts of dye (G) | |
| | + 16 parts of dye (A) | |
| | + 0.5 part of dye (B) | dark blue |

We claim:

1. A dye mixture containing one or more monoazo dyes of the formula (1), one or more monoazo dyes of the formula (2) and one or two copper-formazan dyes of the formula (3) and optionally, one or two dyes of the formula (5); or one or more monoazo dyes of the formula (1), one or more monoazo dyes of the formula (2), and one or more disazo dyes of the formula (4) and optionally, one or two dyes of the formula (5); or one or more monoazo dyes of the formula (1), one or more monoazo dyes of the formula (2), one or two copper-formazan dyes of the formula (3) and one or more disazo dyes of the formula (4), and optionally one or two dyes of the formula (5).

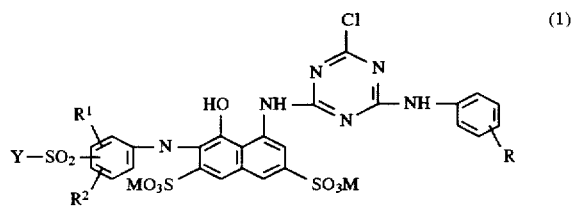

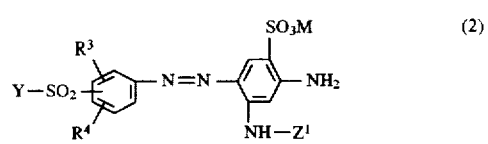

-continued

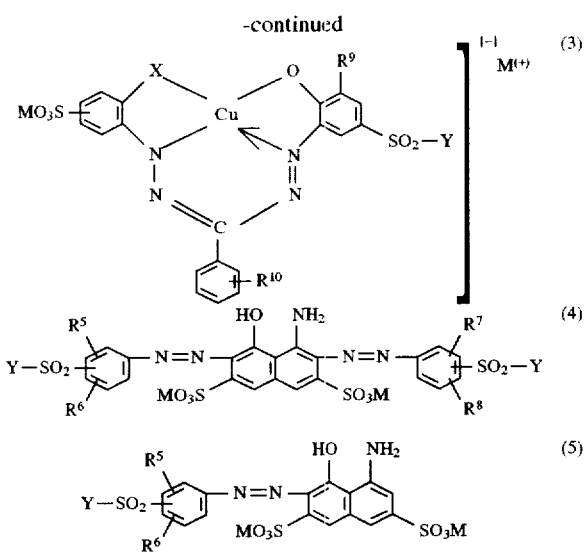

in which

M is hydrogen or an alkali metal;

$R^1$ is hydrogen, methyl, ethyl, methoxy or ethoxy, $R^2$ is hydrogen, methyl, ethyl, methoxy or ethoxy, $R^3$ is hydrogen, methyl, ethyl, methoxy or ethoxy, $R^4$ is hydrogen, methyl, ethyl, methoxy or ethoxy, $R^5$ is hydrogen, methyl, ethyl, methoxy or ethoxy, $R^6$ is hydrogen, methyl, ethyl, methoxy or ethoxy, $R^7$ is hydrogen, methyl, ethyl, methoxy or ethoxy, $R^8$ is hydrogen, methyl, ethyl, methoxy or ethoxy, $R^9$ is hydrogen or sulfo, $R^{10}$ is hydrogen, alkyl of 1 to 4 carbon atoms, sulfo, carboxy, alkanoyl of 2 to 5 carbon atoms or a group of the formula —SO$_2$—Y where Y has one of the meanings given below, X is carbonyloxy of the formula —CO—O— or oxy of the formula —O— or is the group —SO$_3^{(-)}$, each Y, independently of the others, is vinyl, β-chloroethyl, β-thiosulfatoethyl or β-sulfatoethyl, R is hydrogen, methyl, sulfo, carboxy or a group of the formula —SO$_2$—Y where Y has one of the meanings given above, Z1 is alkanoyl of 2 to 5 carbon atoms, benzoyl, 2-cyanoamino-4-chloro-1,3,5-triazin-6-yl, 2-cyanoanino-4-fluoro-1,3,5-triazin-6-yl, 2,4-dichloro-1,3,5-triazin-6-yl or a group of the formula (a)

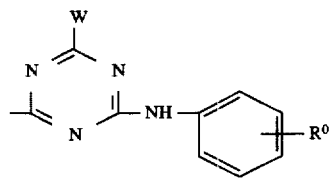

in which

W is chlorine, fluorine or cyanamino and $R^0$ is sulfo, carboxy or a group of the formula —SO$_2$—Y where Y has one of the meanings given above.

2. A dye mixture as claimed in claim 1, containing one or more monoazo dyes of the formula (1), in which R is sulfo, one or more monoazo dyes of the formula (2), in which $Z^1$ is alkanoyl of 2 to 5 carbon atoms, and 1 or 2 copper-formazan dyes of the formula (3).

3. A dye mixture as claimed in claim 1, containing one or more monoazo dyes of the formula (1), one or more monoazo dyes of the formula (2) in which $Z^1$ is a group of the formula (a) and one or two copper-formazan dyes of the formula (3).

4. A dye mixture as claimed in claim 1, wherein $R^1$, $R^3$, $R^5$ and $R^7$, independently of one another, are each methoxy or hydrogen and $R^2$, $R^4$, $R^6$ and $R^8$ are each hydrogen.

5. A dye mixture as claimed in claim 1, wherein each Y, independently of the others, is vinyl or β-sulfatoethyl.

6. A dye mixture as claimed in claim 1, wherein the dye mixture contains two or more dyes of the formula (1) in which in one or two of the dyes the radical R is sulfo and in the other dye(s) of the formula (1) the radical R is a group of the formula —SO$_2$—Y where,Y has the meaning given in claim 1.

7. A dye mixture as claimed in claim 6, wherein the dye(s) of the formula (1) where R is sulfo and the dye(s) of the formula (1) where R is —SO$_2$—Y are present in a mixing ratio of 75:25 to 25:75% by weight.

8. A dye mixture as claimed in claim 1, containing one or more monoazo dyes of the formula (1), two or more copper-formazan dyes of the formula (3) and two or more diazo dyes of the formula (4), as defined in claim 1.

9. A dye mixture as claimed in claim 8, wherein the dye(s) of the formula (3) and the dye(s) of the formula (4) are present in a mixing ratio of 75:25 to 25:75 % by weight.

10. A dye mixture as claimed in claim 8, wherein the dye mixture contains one or two dyes of the formula (5).

11. A dye mixture as claimed in claim 9, wherein the dye mixture contains one or two dyes of the formula (5).

12. A dye mixture as claimed in claim 2, wherein $R^1$, $R^3$, $R^5$ and $R^7$, independently of one another, are each methoxy or hydrogen and $R^2$, $R^4$, $R^6$ and $R^8$ are each hydrogen.

13. A dye mixture as claimed in claim 3, wherein $R^1$, $R^3$, $R^5$ and $R^7$, independently of one another, are each methoxy or hydrogen and $R^2$, $R^4$, $R^6$ and $R^8$ are each hydrogen.

14. A dye mixture as claimed in claim 12, wherein each Y, independently of the others, is vinyl or β-sulfatoethyl.

15. A dye mixture as claimed in claim 13, wherein each Y, independently of the others, is vinyl or β-sulfatoethyl.

16. A dye mixture as claimed in claim 1, containing one or more monoazo dyes of the formula (1), in which R is sulfo, one or more monazo dyes of the formula (2), in which $Z^1$ is alkanoyl of 2 to 5 carbon atoms, and one or more diazo dyes of the formula (4).

17. A dye mixture as claimed in claim 1, containing one or more monoazo dyes of the formula (1) in which R is sulfo, one or more monoazo dyes of the formula (1) in which R is a group of the formula —SO$_2$—Y, and one or two copper-formazan dyes of the formula (3).

18. A dye mixture as claimed in claim 1, containing one or more monoazo dyes of the formula (1) in which R is sulfo, one or more monazo dyes of the formula (2) in which $Z^1$ is alkanolyl of 2 to 5 carbon atoms, one or two copper-formazan dyes of the formula (3) and one or more diazo dyes of the formula (4).

* * * * *